Sept. 30, 1947. V. C. CASS 2,428,109
VEHICLE WHEEL MOUNTING MEANS
Filed July 27, 1946
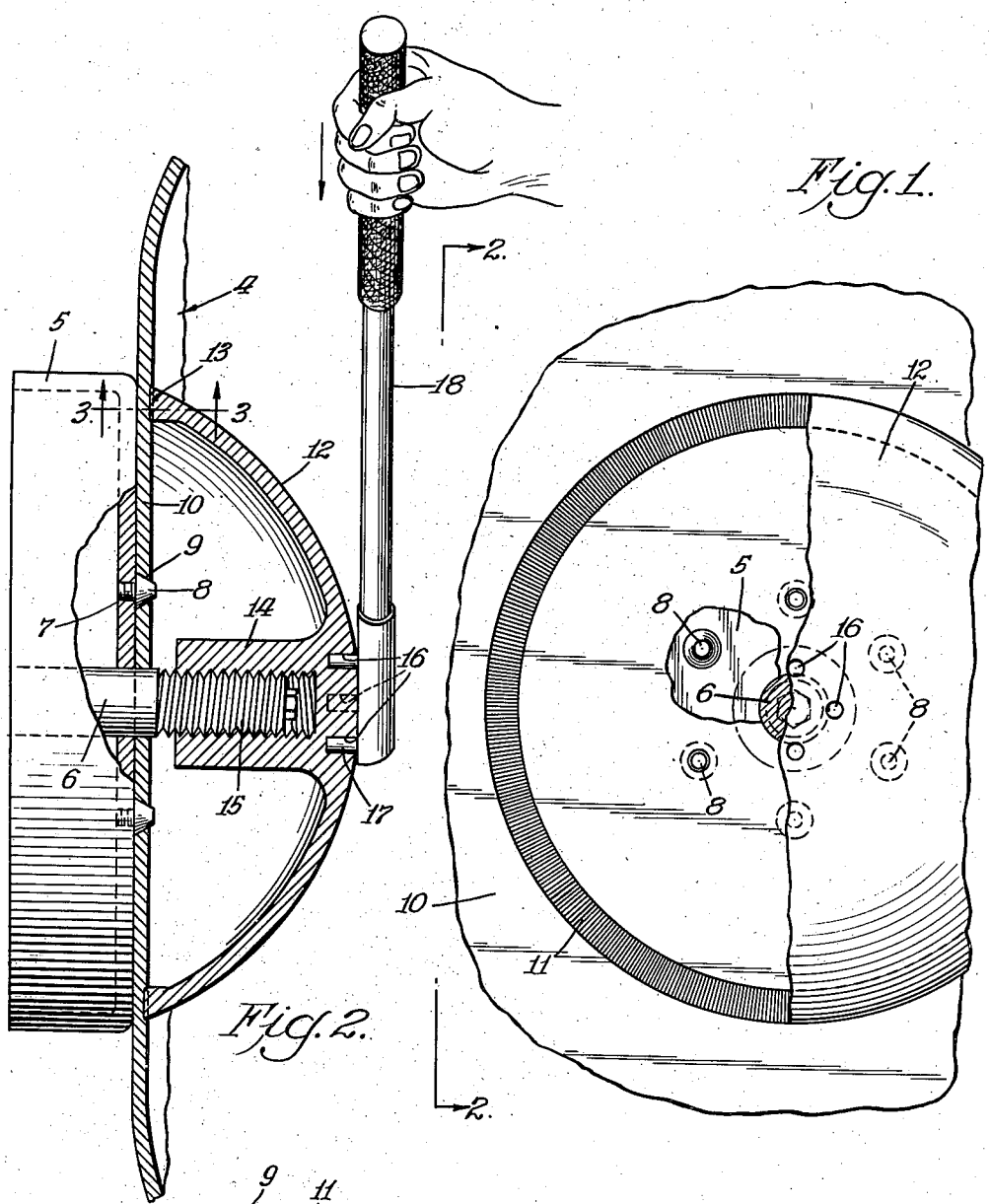
INVENTOR.
BY Vernon C. Cass Patented Sept. 30, 1947

2,428,109

UNITED STATES PATENT OFFICE 2,428,109

VEHICLE WHEEL MOUNTING MEANS

Vernon C. Cass, Chicago, Ill.

Application July 27, 1946, Serial No. 686,743

8 Claims. (Cl. 301—9)

My invention relates to vehicle wheel mounting means, an important object of my invention being to provide novel wheel locating means with reference to the hub structure, and a hub cap which is used for ornate purposes, and also as the lock nut structure of the mounting means.

An important object of my invention is to provide decorative hub cap structure, which functions as a lock nut, and is provided with a serrated flange portion cooperatively engaging a serrated portion on the vehicle wheel surface.

A further object of my invention is to provide a vehicle wheel mounting construction, which is practical in its arrangement, efficient for the purposes for which it is to be utilized, and of such elemental construction as to lend itself readily to economical manufacture in quantity production.

Other features, and objects resident in my invention, will become apparent from an examination of the accompanying drawings, having further reference to the ensuing description, wherein like symbols are used to designate like parts, and in which;

Fig. 1 is a front view of my invention, with certain portions thereof broken away, in order to more clearly depict the relationship of the elements comprising the same.

Fig. 2 is a view looking in the direction of the arrows 2—2 of Fig. 1.

Fig. 3 is an enlarged cross-sectional view, taken substantially, on the line 3—3 of Fig. 2.

Referring to the various views, my invention is generally designated 4, and consists of a wheel plate structure 10, having a series of countersunk recesses 9, so that it may be readily located on a multiplicity of frusto-conical locating slugs 8, having threaded portions for attachment to the hub 5.

The hub 5 is provided with a motivating extension 6, being threaded at 15, in order to engage the threaded hub, or boss 14, of the hub cap 12. The said hub cap is provided with a bottom flange 13, which extends beyond the bottom of the hub 14, the said portion 13 being provided with a series of serrations, or teeth, which cooperatively engage the circularly-shaped toothed portions 11 on the surface of the wheel, drum or plate 10. The hub cap 12 furnishes ornate effects, and through its threaded hub section 14 simultaneously effects a locking of the wheel, when the same is brought into clamping engagement by a spanner wrench 18, having the spanners 17 in engagement with the spanner holes 16 formed in the hub cap. Thus, the wheel can be readily mounted and dismounted, with respect to the motivating portion of the hub structure.

The use and operation of my instant invention, herein described, is readily obvious to those familiar with the art, and is believed to require no further elucidation.

It will be evident that various changes in the construction, combination, and arrangement of parts could be made, which could also be used without departing from the spirit of my invention, and I do not need to limit my invention to such details except as particularly pointed out in the claims.

Having thus described and revealed my invention, what I claim as novel, and desire to secure by Letters Patent, is:

1. Vehicle wheel mounting means comprising, a motivating wheel hub provided with a central threaded extension, a multiplicity of frusto-conical locating studs secured thereto, a wheel drum provided with a multiplicity of counter-sunk locating recesses adapted to fit removably the said locating studs, and a hub cap provided with a central threaded hub extension adapted to engage removably the said central threaded extension, the said wheel drum being further provided with an annularly formed toothed area, the said hub cap being further provided with a flange portion having a toothed skirt portion adapted to engage in releasable locking relationship the said annularly formed toothed area.

2. Vehicle wheel mounting means comprising, a motivating wheel hub provided with a central threaded extension, a multiplicity of frusto-conical locating studs secured thereto, a wheel drum provided with a multiplicity of counter-sunk locating recesses adapted to fit removably the said locating studs, and a hub cap provided with a central threaded hub extension adapted to engage removably the said central threaded extension, the said wheel drum being further provided with an annularly formed toothed area, the said hub cap being further provided with a flange portion having a toothed skirt portion adapted to engage in releasable locking relationship the said annularly formed toothed area, the said hub cap being also provided with spanner recesses to retain removably spanner wrench means.

3. Vehicle wheel mounting means comprising, a motivating wheel hub provided with a central threaded extension, a multiplicity of frusto-conical locating studs secured thereto, a wheel drum provided with a multiplicity of counter-sunk locating recesses adapted to fit removably the said locating studs, and a hub cap provided with a central threaded hub extension adapted to engage removably the said central threaded extension, the said wheel drum being further provided with an annularly formed knurled area, the said hub cap being further provided with a flange portion having a knurled skirt portion adapted to engage in releasable locking relationship the said annularly formed knurled area.

4. Vehicle wheel mounting means comprising, a motivating wheel hub provided with a central threaded extension, a multiplicity of frusto-conical locating studs secured thereto, a wheel drum provided with a multiplicity of counter-sunk locating recesses adapted to fit removably the said locating studs, and a hub cap provided with a central threaded hub extension adapted to engage removably the said central threaded extension, the said wheel drum being further provided with an annularly formed knurled area, the said hub cap being further provided with a flange portion having a knurled skirt portion adapted to engage in releasable locking relationship the said annularly formed knurled area, the said hub cap being also provided with spanner recesses to retain removably spanner wrench means.

5. Vehicle wheel mounting means comprising, a motivating wheel hub provided with a central threaded extension, a multiplicity of frusto-conical locating studs secured thereto, a wheel drum provided with a multiplicity of counter-sunk locating recesses adapted to fit removably the said locating studs, and a hub cap provided with a central threaded hub extension adapted to engage removably the said central threaded extension, the said wheel drum being further provided with an annularly formed toothed area, the said hub cap being further provided with a flange portion having a toothed skirt portion adapted to engage in releasable locking relationship the said annularly formed toothed area, the said toothed hub cap end portion and the said wheel drum area effectively retaining the said wheel on the said motivating wheel hub against accidental displacement.

6. Vehicle wheel mounting means comprising, a motivating wheel hub provided with a central threaded extension, a multiplicity of frusto-conical locating studs secured thereto, a wheel drum provided with a multiplicity of counter-sunk locating recesses adapted to fit removably the said locating studs, and a hub cap provided with a central threaded hub extension adapted to engage removably the said central threaded extension, the said wheel drum being further provided with an annularly formed toothed area, the said hub cap being further provided with a flange portion having a toothed skirt portion adapted to engage in releasable locking relationship the said annularly formed toothed area, the said hub cap being also provided with spanner recesses to retain removably spanner wrench means, the said toothed hub cap end portion and the said wheel drum area effectively retaining the said wheel on the said motivating wheel hub against accidental displacement.

7. Vehicle wheel mounting means comprising, a motivating wheel hub provided with a central threaded extension, a multiplicity of frusto-conical locating studs secured thereto, a wheel drum provided with a multiplicity of counter-sunk locating recesses adapted to fit removably the said locating studs, and a hub cap provided with a central threaded hub extension adapted to engage removably the said central threaded extension, the said wheel drum being further provided with an annularly formed knurled area, the said hub cap being further provided with a flange portion having a knurled skirt portion adapted to engage in releasable locking relationship the said annularly formed knurled area, the said knurled hub cap end portion and the said wheel drum area effectively retaining the said wheel on the said motivating wheel hub against accidental displacement.

8. Vehicle wheel mounting means comprising, a motivating wheel hub provided with a central threaded extension, a multiplicity of frusto-conical locating studs secured thereto, a wheel drum provided with a multiplicity of counter-sunk locating recesses adapted to fit removably the said locating studs, and a hub cap provided with a central threaded hub extension adapted to engage removably the said central threaded extension, the said wheel drum being further provided with an annularly formed knurled area, the said hub cap being further provided with a flange portion having a knurled skirt portion adapted to engage in releasable locking relationship the said annularly formed knurled area, the said hub cap being also provided with spanner recesses to retain removably spanner wrench means, the said knurled hub cap end portion and the said wheel drum area effectively retaining the said wheel on the said motivating wheel hub against accidental displacement.

VERNON C. CASS.